United States Patent [19]

Mölter et al.

[11] 3,861,542

[45] Jan. 21, 1975

[54] ONBOARD LIFTING DEVICE WITH ON-BOARD DRIVE FOR RETRACTING AND EXTENDING THE LIFTING DEVICE

[75] Inventors: Gunther Mölter; Kurt-Werner Iben, both of Ottobrunn; Werner Zimmermann, Puchheim, all of Germany

[73] Assignee: Messerschimitt-Bolkow-Blohm GmbH, Munchen, Germany

[22] Filed: Mar. 21, 1973

[21] Appl. No.: 343,398

[30] Foreign Application Priority Data
Mar. 25, 1972 Germany............................ 2214746
Mar. 25, 1972 Germany............................ 2214747

[52] U.S. Cl.............. 214/75 G, 214/672, 244/137 R
[51] Int. Cl................................................. B60p 1/44
[58] Field of Search...... 214/75 R, 75 G, 75 T, 670, 214/671, 672, 673, 674; 187/9, 17, 95; 212/128, 129; 244/118 R, 137 R

[56] References Cited
UNITED STATES PATENTS

| | | | |
|---|---|---|---|
| 1,991,576 | 2/1935 | Remde................................ | 187/9 |
| 2,088,260 | 7/1937 | Cochran.............................. | 214/674 |
| 3,002,719 | 10/1961 | Weiland et al..................... | 214/75 R |
| 3,186,571 | 6/1965 | Holzhause........................... | 214/674 |
| 3,651,965 | 3/1972 | Simonelli et al.................. | 214/75 T |

*Primary Examiner*—Robert G. Sheridan
*Assistant Examiner*—Lawrence J. Oresky
*Attorney, Agent, or Firm*—Woodhams, Blanchard and Flynn

[57] ABSTRACT

Onboard cargo loading means for aircraft. There is provided an upper frame means depending from the aircraft fuselage at a point adjacent a cargo hatch therein. A lower frame structure is movable up and down on the upper frame structure and a lift platform is supported for up and down movement on and along the lower frame structure, with the upper end of the lower frame structure even in its lowermost position overlapping the lower end of the upper frame structure. First and second rollers are placed at the upper and lower end of the lower frame structure. A third roller is placed at the lower end of the upper frame structure and drive sprockets with prime mover means for same are provided elsewhere, preferably on the upper end of the upper frame structure. A chain wraps around said sprocket, under said third roller, over said second roller, under said first roller and back to said sprocket, being fastened at a convenient point therealong to said platform. Thus, energizing of said prime mover first lifts said platform to the upper end of the lower frame structure, then lifts the entirety of said platform and lower frame structure until it fully overlaps the upper frame structure and the platform is flush with the floor of the cargo space of the aircraft. The arrangement of rollers is such that the relative position of the upper and lower frame structures can change with respect to each other without disturbing its operability at any time during a loading operation, particularly if the aircraft sinks lower in response to such loading. In a further development of the invention, means are provided for moving the entire platform supporting structure into the aircraft fuselage for storage or out therefrom for a loading operation. A power operated lever is supported within the aircraft fuselage below the floor of the cargo space and the driven end thereof is connected through one end of a centrally supported lever to an upper end of the platform supporting frame structure. Application of power to said lever will lift said frame structure into the fuselage. The frame structure also carries a brace which in operating or extended position of the loading mechanism bears against aircraft fuselage for steadying said loading mechanism. Linkage is provided which is connected to the other end of said last above-mentioned lever for automatically collapsing said brace against the remainder of said frame structure as the lifting mechanism is retracted into the aircraft fuselage.

9 Claims, 6 Drawing Figures

ONBOARD LIFTING DEVICE WITH ON-BOARD DRIVE FOR RETRACTING AND EXTENDING THE LIFTING DEVICE

The invention relates to an onboard container lifting device for loading and unloading aircraft comprising two uprights which can be stored in the aircraft, which uprights consist of an upper part and a lower part which latter can be moved longitudinally of said upper part. The upper part is supported on the aircraft fuselage in operating position and the lower part has a horizontal platform which is movable in longitudinal direction of the uprights. The invention further relates to an onboard drive for retracting and extending of a container lifting device for aircraft.

The loading of an aircraft equipped with a container lifting device is accomplished by first loading the container or other goods to be loaded onto the horizontal platform of a lifting device. The platform is then moved vertically or inclinedly upwardly by some suitable drive mechanism. However, a problem appears at this point in that the distance of the aircraft fuselage from the ground varies with the load, namely, the distance is reduced as the load increases. In the case of one known onboard container lifting device of the type mentioned above, the change in the distance of the aircraft fuselage from the ground is accommodated by moving the lower part telescopically inside the uprights by means of a threaded spindle which can be operated by a handwheel mounted on the outside of the upright until the lower part rests firmly on the ground. This, however, has the disadvantage that auxiliary personnel is required on the ground in order to operate the handwheel and to thus move the lifting device each time into the final position required for loading and unloading. (Compare U.S. Pat. No. 3,478,904.)

Thus, the basic purpose of the invention is to produce an onboard container lifting device for the loading and unloading of aircraft, which can be moved from onboard into its loading and unloading position, whereby the lower part of the frame structure supporting the platform is extendible until it rests firmly on the ground in any load condition including on uneven ground and it automatically adjusts to the new load level in the case of change in elevation of the fuselage.

This purpose is attained according to the invention by guiding a continuous chain in a conventional manner over two rollers which are arranged on the extendible lower part at a nonchangeable distance from one another and over a roller which is positioned on the upper part between the rollers of the retractable lower part, whereby the lower part is easily held by suitable means, for example its own weight, against the ground.

In order to reduce the load of any one chain, sprocket wheels or rollers, the invention preferably provides these parts in duplicate.

A further purpose of the invention is to produce a drive of the above-mentioned type which does not hinder the loading and unloading operation when the apparatus is in extended condition. One of the possible means for attaining this objective consists, according to the invention, in that the drive elements for the lifting device are so arranged that when the apparatus is in extended condition, said drive elements lie below the floor of the cargo space. To achieve this result, the invention provides that a bent lever is rotatably supported on the aircraft fuselage, one leg of which bent lever is operated by a preferably hydraulic unit and the other leg of which bent lever is hingedly connected to a leg of a further lever. The pivot point of this latter lever is at the upper end of the upright which is pivotably hinged on the aircraft fuselage.

The inventive drive mechanism contains a support bar which serves to support on the aircraft fuselage the frame structure associated with the platform when the lifting device is in the extended position. In order to store this support bar simultaneously with the drive for retracting and extending the lifting device in the fuselage, the invention provides further that the lever which is pivotably supported on the upright includes a second leg which is hingedly connected to a second bent lever. This latter is supported in the upper part of the frame means through a connecting bar and said second bent lever is hinged to such support bar of the lifting device through a further connecting bar.

To achieve a greater stability of the drive, the levers and bars can according to a further characteristic of the invention be provided in duplicate. They are advantageously adjustable in length to permit an adjusting of the drive mechanism.

The invention is discussed illustratively in the enclosed drawings, in which.

Figure 1:
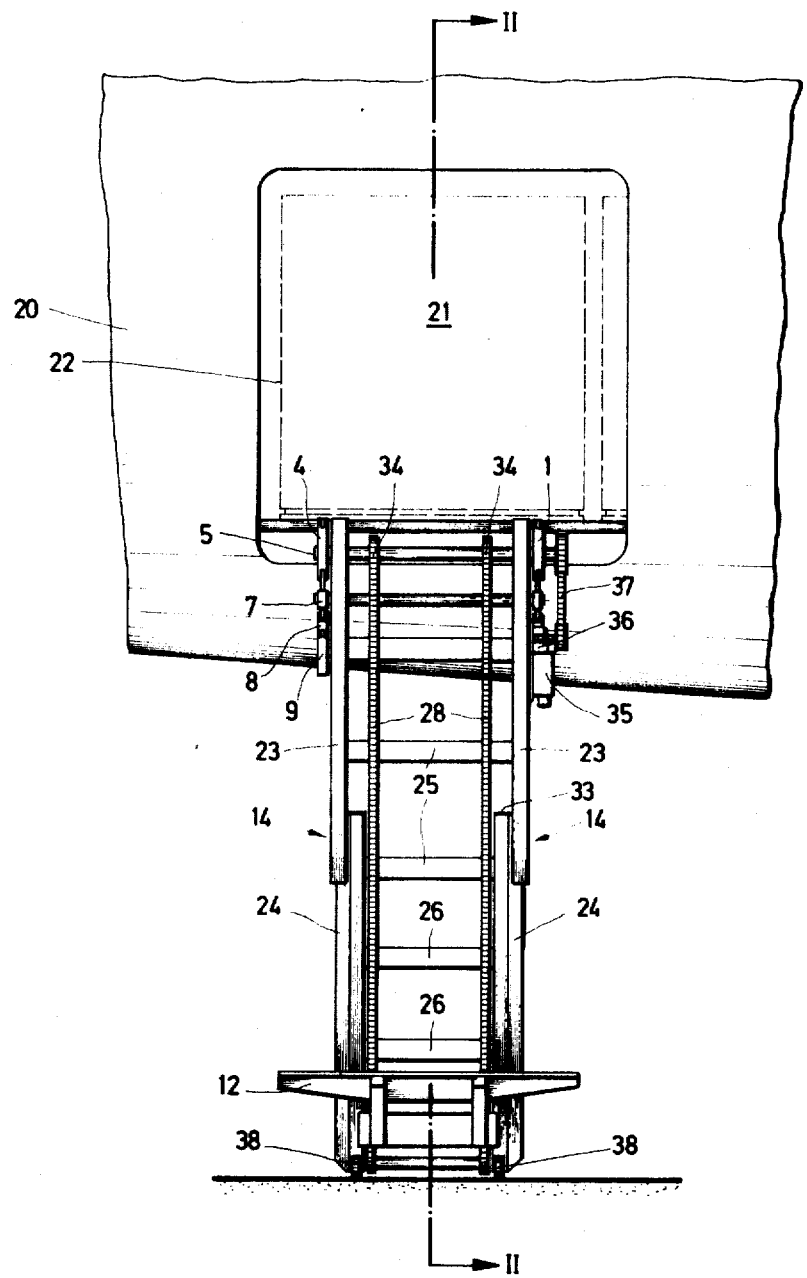
FIG. 1 is the front view of the lifting device with a lowered platform.
Figure 2:
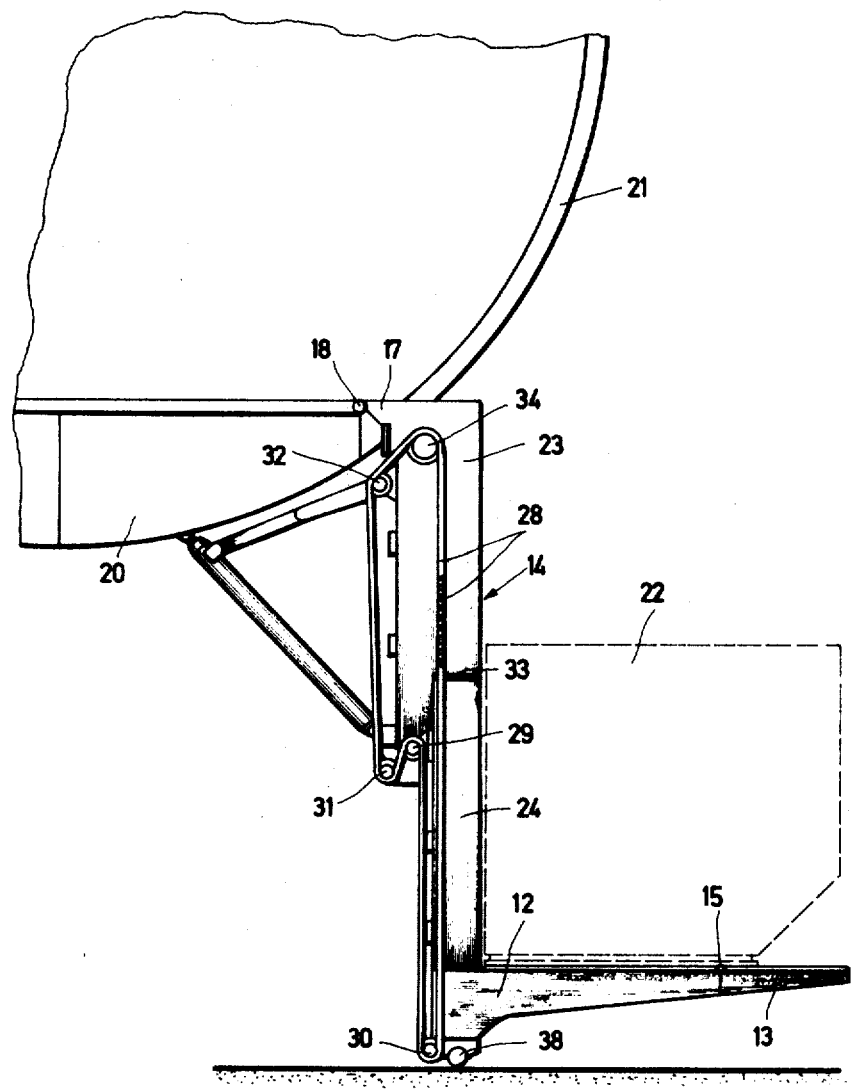
FIG. 2 is a cross-sectional view along the line II—II of FIG. 1 with a lowered platform.

In FIGS. 1 and 2, the numeral 20 identifies the aircraft fuselage, 21 the opening for the cargo hatch and 22 (in dashed lines) a container. The container lifting device contains the two uprights 14 each of which includes duplicate upper parts 23 and lower parts 24, said upper and lower parts being telescopically related. The upper parts 23 and the lower parts 24 have at their respective upper ends a projection 33, the purpose of which will be discussed below. Two sprocket wheels 34 are supported at the upper end of the upper parts 23, which sprocket wheels are driven by the motor 35 through the gear 36 and the chain 37. The chains 28 engage the sprocket wheels 34 and extend over the two rollers 29 and 30 which latter are supported on the upper and lower ends, respectively, of the lower part 24. The chains 28 further engage a pair of rollers 31 which are supported on the upper part 23. The rollers 31 are positioned between the guide rollers 29 and 30 which are supported on the lower part 24. Two further guide rollers 32 are provided for convenience but are unimportant for the actual operation of the container lifting device.

The platform 12 is arranged vertically movable on the lower parts 24. Its front part 13 is pivotable about the joint 15 in order not to be an obstacle during storage of the loading device. At the lower end of the lower part 24, there are provided the ground wheels 38. The chains 28 are fastened to the platform in any convenient manner.

The lifting device operates as follows: After loading the platform 12, the motor 35 is energized which drives the sprocket wheels 34 and the platform 12 is lifted through the chains 28. The lower part 24 of each upright 14 is freely movable with respect to the upper part 23, the function of the upper parts 23 being to guide the platform 12 in vertical direction and to prevent its tilting.

Since the space between the rollers 29 and 30 is constant, the chain is always evenly tensioned regardless of change in the height of the aircraft fuselage relative to the ground, which change occurs during loading of the aircraft.

Figure 3:
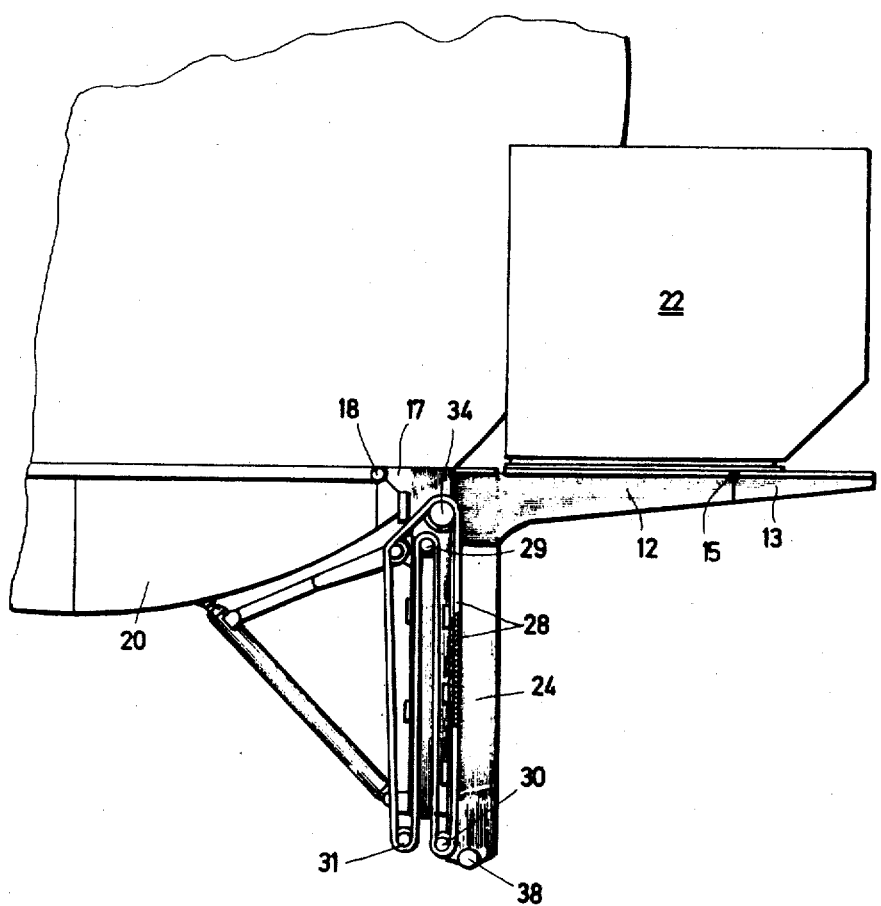
FIG. 3 is a cross-sectional view along the line II—II of FIG. 1 with a lifted platform.

Upon lifting of the platform, its upper edge hits the projection 33 at the upper edge of the lower parts 24 and takes same along in the upward direction. The position of the lifting device with a lifted platform is illustrated in FIG. 3. The platform is at this point flush with the floor of the cargo space so that the container 22 can be easily moved into the cargo space.

The container lifting device is lowered in the reversed manner. First the motor 35 so drives the sprockets 34 that the lower parts 24 are moved downwardly from the position illustrated in FIG. 3. Since the lower parts 24 are freely movable with respect to the upper parts 23, they move downwardly until the wheels 38 contact the ground. If the height of the fuselage 20 changes relative to the ground due to change of load, the lower parts 24 follow this change in such a manner that the wheels 38 always maintain contact with the ground.

The mechanism for holding the frame structure 14 and associated parts in operating position as shown or for retracting same through the cargo hatch 21 into the aircraft fuselage may be that shown in FIGS. 4-6 and described hereinafter or it may be any other convenient mechanism which may be provided for the purpose.

Figure 4:
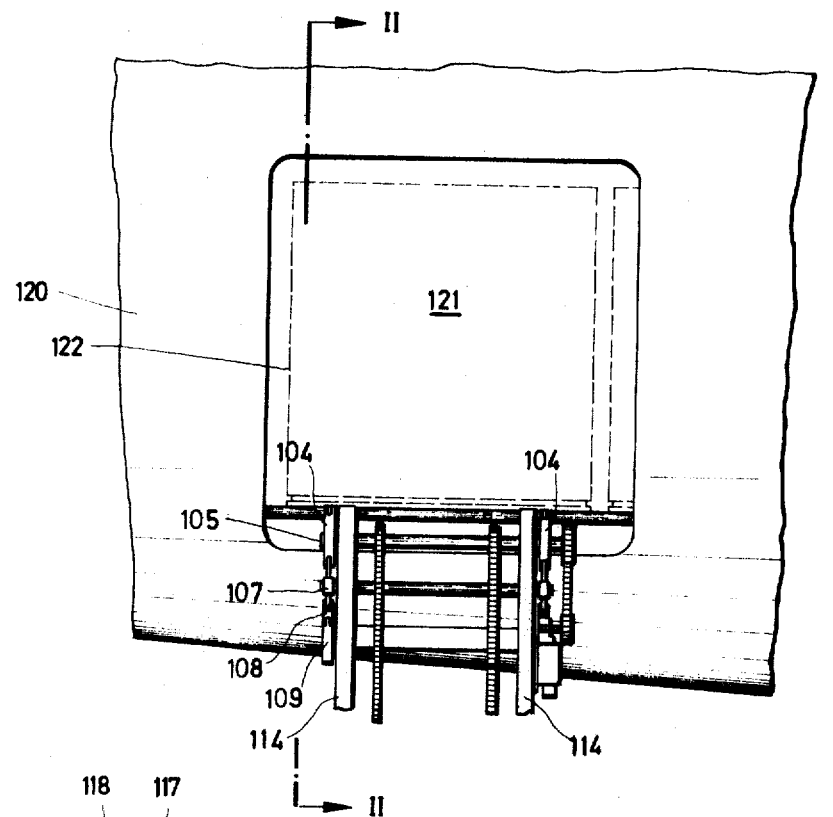
FIG. 4 is a view of the rear freight door.
Figure 5:
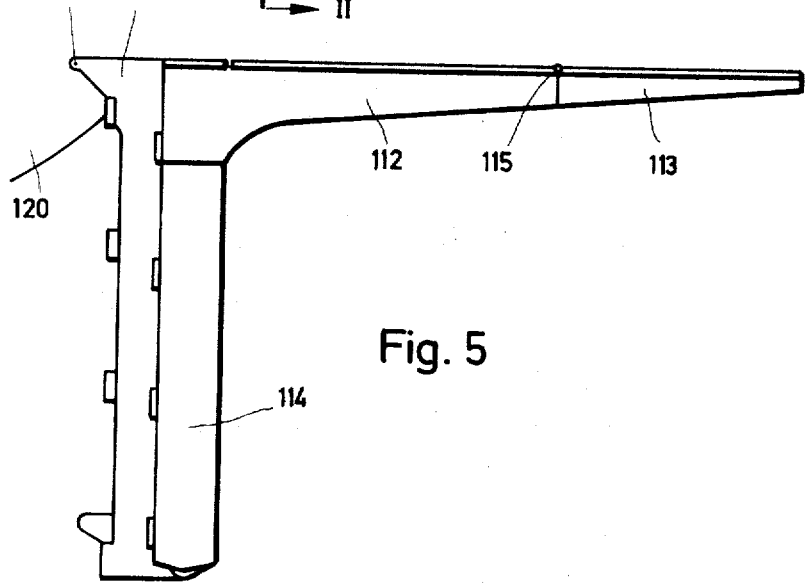
FIG. 5 is a cross-sectional view along the line II—II of FIG. 4.

Turning now to FIGS. 4 and 5 in more detail, the numeral 120 indicates the aircraft fuselage and 121 the opening for the cargo door. The numeral 122 identifies a container, which is illustrated by dashed lines.

Figure 6:
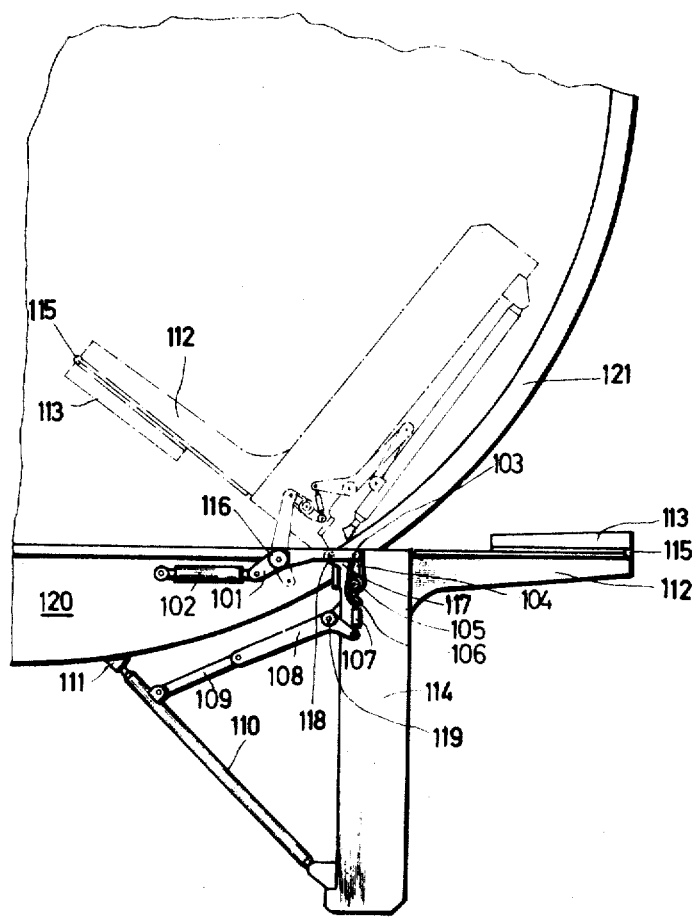
FIG. 6 illustrates in an enlarged scale the upper portion of the frame means carrying the platform.

The drive for driving the container lifting device into and out of the aircraft cargo zone is illustrated in detail in FIG. 6. The extended position of the lifting device is illustrated in full lines and the retracted position is illustrated in dash-dotted lines.

The numeral 112 indicates the platform which is vertically movable on the uprights 114 and which is in its uppermost position in FIG. 6. Said uprights 114 may be the uprights 14 of FIGS. 1-3 or they may be corresponding parts of a different frame and lift mechanism. In this position the platform is flush with the floor of the cargo space. The outer end 113 of the platform is pivotable about the joint 115 in order not to create an obstacle during storage. The platform 112 is not illustrated in FIG. 4 in order to better show the drive mechanism. The uprights 114 have noses 117 as is best shown in FIG. 5, the ends 118 of which noses are hinged to the aircraft fuselage 120.

The drive elements for extending and retracting the container lifting device, which drive elements are identified by reference numerals 101, 102, 104, 107, 108, 109, 110 and 119 are provided in duplicate, as shown in FIG. 4, on the left and on the right side of the two uprights 114. The following description is limited to the elements on one side of the uprights 114.

The bent lever 101 is rotatably supported on the aircraft fuselage at the point 116, which bent lever is moved by any suitable power system, for example a hydraulic cylinder 102, which engages one end of the bent lever. The other end of the bent lever 101 is hingedly connected to one leg 103 of the lever 104, which in its central zone 105 is pivotably secured on the uprights 114 and thereby on the lifting device. The other leg 106 of the lever 104 is hingedly connected to a second bent lever 108 through a connecting rod 107, which bent lever 108 is supported in the point 119 on the upper part of the upright 114 and is pivotally connected through the connecting rod 109 to the support rod 110 of the upright 114 of the lifting device. In the extended position of the lifting device the support bar 110 bears at the point 111 against the fuselage.

The device operates as follows: Upon applying a force onto the bent lever 101, its end 103 moves upwardly and acts through the lever 104 supported at point 105 of the upright to pull the upright 114 of the lifting device upwardly. This causes the upright 114 and the frame structure including same to describe a circular motion around the point 118 of the fuselage. At a selected point in the above-described movement but before the lifting device moves into the fuselage, the bent lever 108 which is supported at the point 119 on the upright 114 and the connecting rod 109 collapse and pull the support rod 110 to the upright 114.

The completely folded position of the drive is illustrated in dash-dotted lines in FIG. 6.

Although a particular preferred embodiment of the invention has been disclosed above for illustrative purposes, it will be understood that variations or modifications thereof which lie within the scope of the appended claims are fully contemplated.

The embodiments of the invention in which exclusive property or privilege is claimed are defined as follows:

1. An onboard lifting mechanism for the loading and unloading of aircraft, comprising:
   frame for supporting and effecting a lifting of a load carrying platform, said frame means being pivotally fastened to said aircraft at a support point at least adjacent the lower edge of a cargo hatch;
   means for assisting the support of said frame means when in open operating position and for retracting same through the cargo hatch into said aircraft for storage of same;
   two leg lever means pivotally supported at a point fixed with respect to said aircraft, one leg thereof on one side of said fixed point being cooperable with a source of power and the other leg of which on the other side of said fixed point being pivotally connected through a first leg of a second lever to said frame means, said second lever being pivotally fixed to said frame means at a point sufficiently spaced from said support point that lifting of said second lever will effect rotation of said frame means around said support point whereby upon activation of said power source said frame means will be pivoted around said support point and through said cargo hatch in a selected direction, said second lever including also a second leg and a connecting bar pivotally connected at one of its ends thereto, a support bar pivotally connected to a point on said frame means spaced from said support point and adapted at its other end for bearing against said aircraft and a linkage connecting the other end of said connecting bar to said support bar for pulling same toward or away from said frame means as said frame means pivots into or out of said cargo hatch.

2. An onboard lifting mechanism for the loading and unloading of freight on a floor of a cargo space on an aircraft, comprising:
   at least one upright member composed of an upper part and a lower part, said upper part being pivotally secured to said aircraft for movement about a pivot axis into and out of an opening in said aircraft, said lower part being longitudinally movable relative to said upper part and having means defining a stop thereon;
   means for pivoting said lifting mechanism into and out of said aircraft;
   at least one continuous chain;
   guide means mounted on said upper and lower parts for guiding said chain;
   drive means for driving said chain over said guide means;
   a lifting platform secured to said chain and movable therewith, said lifting platform being adapted to contact said stop means on said lower part during a vertical upward movement to lift said lower part therewith relative to said upper part, said lower part being adapted to engage the ground and, when said lifting platform is spaced below said stop means during the time that said lower part is engaging said ground, being free to move vertically to automatically compensate for changes in vertical spacing between the ground and said pivot axis on said aircraft and auxilary support means connected to said upright member and operatively connected to said aircraft for holding said upright member in a substantially vertical position when said lifting mechanism is in use.

3. The outboard lifting mechanism according to claim 2, wherein said guide means comprise at least a pair of vertically aligned and fixedly spaced sprockets mounted on said upper part and a pair of vertically aligned and fixedly spaced sprockets mounted on said lower part aligned with said sprockets on said upper part, the upper one of said sprockets on said lower part being positioned between said sprockets on said upper part, said sprockets on said lower part being movable vertically along a path horizontally spaced from said pair of sprockets on said upper part.

4. The outboard lifting mechanism according to claim 3, wherein a pair of horizontally spaced and parallel upright members are provided each being composed of an upper part and a lower part;
   wherein a pair of horizontally spaced guide means are provided on each of said upper and lower parts.

5. The outboard lifting mechanism according to claim 2, wherein said drive means is mounted on said upper part and, when said upper part is outside said aircraft, located below said floor of said cargo space.

6. The outboard lifting mechanism according to claim 2, wherein said means for pivoting includes second drive means for driving said upper part about said pivot axis into and out of said opening in said aircraft.

7. The outboard lifting mechanism according to claim 6, wherein said second drive means comprise a first two arm pivotally supported lever secured to said aircraft, said two arms being on opposite sides of a pivot support axis therefor, one leg of said first two arm lever being connected to a drive unit for effecting a driven pivoting movement of said lever about said pivot axis, a second lever having at least one arm pivotally secured to said upper part, the other arm of said first two arm lever being pivotally connected to said one arm of said second two arm lever.

8. The outboard lifting mechanism according to claim 7, wherein said second lever is a two arm lever, said one arm thereof being connected to the other arm of said first two arm lever;
   wherein said auxiliary support means includes a support bar pivotally secured to said upper part at an end remote from said pivot axis therefor, a third two arm lever pivotally connected to said upper part above the location of said pivotal connection for said support bar means, one of said arms of said third two arm lever being connected to said support bar means and the other of said arms of said third two arm lever being pivotally connected to the other arm of said second two arm lever.

9. The outboard lifting mechanism according to claim 8, wherein said support bar means includes a lever pivotally secured thereto which is pivotally connected to said one arm of said third two arm lever.

* * * * *